Jan. 1, 1957
C. J. S. THOMAS
2,776,216
PROCESS FOR PACKAGING MEAT PRODUCTS
AND ARTICLE PRODUCED THEREBY
Filed April 3, 1951
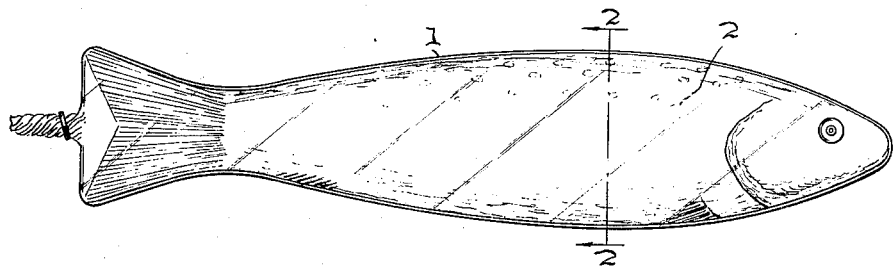
FIG. 1.
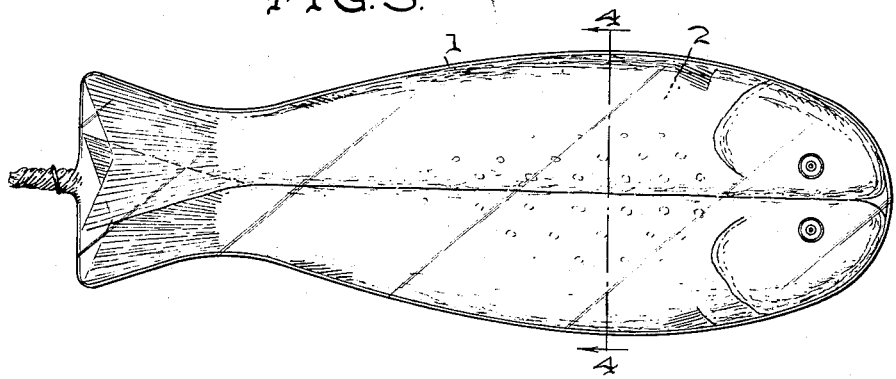
FIG. 3.
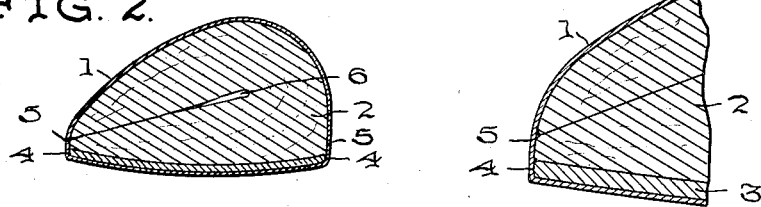
FIG. 2.
FIG. 5.
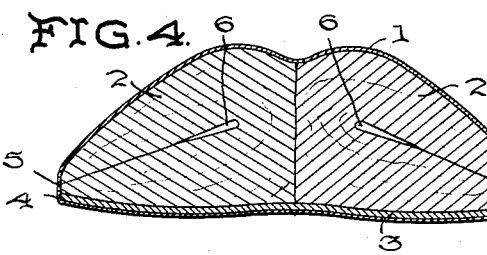
FIG. 4.
INVENTOR.
COLIN J. S. THOMAS
BY
Walter C. Wheeler
ATTORNEY United States Patent Office 2,776,216
Patented Jan. 1, 1957

2,776,216

PROCESS FOR PACKAGING MEAT PRODUCTS AND ARTICLE PRODUCED THEREBY

Colin J. S. Thomas, Ruxton, Md.

Application April 3, 1951, Serial No. 219,663

17 Claims. (Cl. 99—174)

This invention relates to the packaging or wrapping of meat products and especially to novel means for preserving a predetermined contour of a part or all of such a product, such as the contour of a fish, and to eliminate or diminish to a minimum air spaces in and around the product within the wrapping.

Heretofore meat products such as hams and bacon have been enclosed in wrappings of textile woven material which are drawn tightly around the articles and stitched. This kind of a wrapping is solely for protection. It does not permit of visual inspection of the wrapped material without destroying the covering. It does not tend to preserve any given shape to the wrapped article, and it provides little or no protection from oxygen of the atmosphere. Dressed fowl has been wrapped for freezing in a transparent or translucent sheet material which is drawn or shrunk tightly about the fowl. This kind of a wrapping is a desirable enclosure for materials of irregular and massive contour, the shapes of which are not material as a matter of sales display. The wrapping is not entirely satisfactory however, where the material is frozen for the reason that quite large cavities remain in the wrapped fowl and considerable water is present in the cavities which collects upon the inside of the wrapping on freezing. This kind of a wrapping modified by completely filling the cavity in a fowl with frozen water adds little, if any, improvement over a cavity which is only partially filled with frozen water. The presence of added water practically prevents accurate weighing of the packaged fowl. None of these wrappings, however, is satisfactory for wrapping a meat product which has a predetermined characteristic shape such as a fish, wherein it is material to preserve intact an easily deformable feature of the product such as a fin or tail structure and where the wrapped material does not have a non-deformable skeleton structure which prevents distortion when the wrapping material is tightly stretched or shrunk around the material. The wrappings heretofore used do not materially exclude atmospheric air from cavities within the wrapping.

It is among the objects of this invention to provide a wrapping which entirely eliminates or diminishes internal cavities of the wrapped material so that little or no atmospheric air will remain in the package, thus materially improving the preservative qualities of the wrapping. Another object is to provide a wrapping which excludes all material amounts of atmospheric air from between the wrapped material and the wrapping. Another object is to provide a wrapping which permits the shape and color of the wrapped material to be displayed and readily inspected. A still further object is to provide a planar or flat base upon which the wrapped material is supported and about which the outer wrapping is shrunk and to exclude air from the wrapping. Still other objects of the invention will be apparent from the following more detailed description thereof.

I have found a combination of materials and a method of mounting and wrapping such articles which provides packaged meat products in excellent form for packing in refrigerated spaces, and further provides a protective covering closely conforming to the shape of the wrapped material. The wrapping is sufficiently transparent to faithfully display the exterior color and easily distortable physical features of the wrapped material. The finished package may be caused to be shaped so as to faithfully display desired characteristic lines of the article and provide an article of distinctive appearance. For example, a fish or a pair of fish are wrapped in accordance with the present invention so that the finished package simulates the characteristic appearance of a fish and the easily distortable parts of individual fish such as the tail fin are faithfully preserved while still providing a protective wrapping stretched over and around the distortable part and excluding air pockets from within the wrapping. The packaging means comprises a relatively stiff base material which is enclosed within the outside wrapping and this wrapping conforms to the base element as well as to all the exposed surface of the wrapped material so that air bubbles are excluded and frost forming receptacles are excluded from the outer surface of the base material. This is a considerable advantage since the deteriorating effect of the air is excluded from this part of the package. The exposed surface of the base material reverse to the surface which is in contact with the wrapped material is rendered visible, so that printing or identification marks may be readily seen through a transparent wrapping.

The invention will be more fully described with reference to the accompanying drawings which show an illustrative embodiment of the invention, in which:

Fig. 1 is a top plan view of a fish wrapped in accordance with the present invention.

Fig. 2 is a cross-sectional view of the article shown in Fig. 1, taken along the line 2—2 of Fig. 1.

Fig. 3 is a top plan view of a pair of fish mounted back to back and wrapped in accordance with the present invention.

Fig. 4 is a cross sectional view of the package shown in Fig. 3, taken along the line 4—4 of Fig. 3.

Fig. 5 is an enlargement of a portion of Fig. 4 showing the closed collapsed cavity of a fish from which the viscera have been removed, and the disposition of the wrapped material and wrapping at the edge of the base material.

In general, the various parts of the wrapping comprise an enclosing sheet-like covering, preferably of a transparent or translucent filamentous material. The material is of a kind which is imperforate to air and vapor, pliable, relatively strong, and which upon being heated or immersed in hot water will shrink, and when heated to such temperature and tightly shrunk around a wrapped object will remain sufficiently strong not to rupture. Referring to Figs. 1 to 5 of the drawings the easily deformable material 2 to be wrapped, such as a dressed fish, is laid on a formed, relatively difficultly deformable sheet-like base element 3 which is shaped to conform generally to a longitudinal cross-sectional shape of the article to be wrapped, such as a fish. The shape of the base element is preferably but not necessarily made smaller in one or more dimension than the maximum longitudinal cross-section of the article to be wrapped in order to provide for compressing the article when the wrapping material is shrunk around the article. The base element should be shaped and limited in area so that the material of the article to be wrapped will be distorted to the very edge of the base element when the wrapping is shrunk and so that no air space will remain around this margin. The base element may be formed from a relatively thin material such as a relatively stiff paper cardboard, but other materials having the desired properties can be used. In the case of a wrapping for an eviscerated fish such as that shown in the drawings, a cardboard of desired thickness and stiffness is cut out generally like a longitudinal cross-section of the fish to be wrapped and of a size such that when the wrapping material is shrunk around the article, the tail fin will coincide with the shaped tail portion of the base material and the meaty portions of the fish will be distorted to conform to the surface of the base material throughout, and so that the meaty portions of the article will meet smoothly at the margins of the base material and the margins of the cavities within the fish will be drawn together and close the cavities.

A suitable sheet wrapping material for this purpose is a vinyl vinylidene chloride copolymer which is transparent or only slightly translucent. It is economical to form the sheet material into a bag but a plain sheet of material may be used instead of a bag. A single fish such as that shown in Fig. 1 may be laid on the base element 3 and inserted in a bag made of the above named plastic sheet material. The air in the bag is then exhausted sufficiently to partially or wholly collapse any cavities within the eviscerated fish and to cause the bag to collapse and conform to any surface cavities or external undulations of the article. In this form the plastic sheet is somewhat wrinkled and deformed in numerous different directions. The mouth of the bag or wrapping is then suitably sealed as by twisting together the projecting portions which may be tied with a string or stapled as shown in Figs. 1 and 3. The article thus wrapped is then heated in order to shrink the sheet material. The wrapping is heated to a temperature which causes the wrapping to shrink. It is convenient to immerse the entire wrapped article in hot water which is heated to a temperature sufficient to cause extensive shrinking of the plastic bag, say to about 70% of its original size. The temperature may be regulated according to the shrinking characteristics of the kind of material used for the wrapping. A temperature of about 90° C. is suitable for shrinking the above named polymer, but higher or lower temperatures may be used. This shrinkage causes the wrapping material to be tightly and smoothly drawn around the exposed surfaces of the wrapped material and base element and to compress the meaty material within the wrapping and against the base element. The bag or wrapping is made of suitable snugness to distort the meaty parts of the wrapped material when the wrapping is shrunk, and so that the edges 4 of the base element 3 will conform smoothly to the distorted confined margins 5 of the wrapped material when the width of the base material is narrow as shown in Fig. 5, and the shrinking of the sheet material 3, collapses the meaty article more or less according to the amount of exhaustion and the amount of shrinkage applied, and the meat and base element conform to each other. There will remain either no cavity or only a diminished cavity 6 within the packaged material. The exhaustion of air tends to collapse the cavity 6 within the material. The exhaustion together with the shrinkage of the wrapping, completely closes the outer margins of the cavity. This results in a partial or a total collapsing of any cavity in the wrapped material so that all air is excluded from such internal cavities 6 or all but immaterial amounts are excluded. Spaces and air pockets are also eliminated from between the sheet material and depressions in the surface of the wrapped material. Further, the outer edges of the cavity are securely closed by the shrinkage of the wrapping so that upon freezing, any frost which may result from the freezing of moisture within the package is obscured within the closed cavity. At the same time, the shrinking of the wrapping material conforms exactly to the outer surfaces of the fish and base material so that all the cavities wherein frost or frozen water might accumulate are closed or obscured from view. It is evident that all cavities may be completely collapsed and eliminated by the exercise of care, but partial collapsing of such cavities is effective provided the margins of the cavities are drawn together.

In assembling two fish as shown in Figs. 3 and 4, the base material 3 is preferably cut out so that the fish can be assembled back-to-back. At the tail end, the base material is shaped similar to that of a fish and so that the terminus of the tail fin of one of the fish will cover somewhat more than half of the tail portion of the base material. In length the base material is cut out about the length of the fish to be packaged, but the width is preferably made somewhat narrower than the maximum width of two fish laid back to back and upon their sides. This provides for considerable distortion of the more easily distortable meaty portions of the fish when air exhaustion and shrinkage of the sheet material are applied. The first fish is laid on the base material with one edge of the tail fin coinciding with one edge of the tail fin portion of the base material as shown in Fig. 3. Then the second fish is laid on the base material back-to-back to the first fish and with its tail overlapping that of the first fish and with the non-overlapping portion of its tail conforming to the remainder of tail portion of the base material. The fish thus assembled on the base material are then wrapped in the plastic sheet or placed in the plastic bag, and the packaging from this point is completed as described above with reference to Fig. 1. In this form of package, the shrinkage of the meaty parts of the fish caused by the evacuation of the air and by the shrinkage of the sheet material may distort the meaty parts exactly in conformity to the base material and to the contiguous parts of the other fish so that any space wherein frost may collect in a frozen package is eliminated or minimized to the smallest degree. A small submerged cavity which would remain between the fish and the base material and a similar space in the exposed area along the backs of the fish which would remain within a wrapping which was not exhausted and shrunk, are eliminated.

However, in order to avoid excessive exhaustion and eliminate or minimize spaces within the wrapping next to the base material, a base material may be provided which will spring inwardly slightly as exhaustion is applied in order to meet the surfaces of the cavity as the meaty material is drawn toward the base material. This is indicated in the drawings by a slight concavity of the base material shown in a cross-sectional view. At the edges of the base material slight distortion is sometimes convenient in order to completely eliminate air pockets without applying excessive exhaustion and shrinkage of the sheet material. However, a relatively undistortable base material can be used to effect the objects of this invention materially. In general, the wrapping conforms exactly to the contour of the fish and no space usually remains. A small slit-like cavity which may be eliminated by extreme evacuation and shrinkage or by careful packaging sometimes appears; but due to its small size and slit-like form, and because it is submerged, it is relatively unimportant. The wrapped material of any description may, and in most cases is finally frozen by methods well known.

Meat products thus packaged display not only a shape which simulates an article of desired or natural form, but also effectively displays the color and other physical characteristics of the material. When a meat product, such as a fish, is packaged so as to eliminate air pockets underneath the wrapping and without the use of the relatively undistortable base element, the thin most easily distortable parts of the fish, such as the tail fin, are caused to fold or roll in an uncanny manner into an unsightly, displeasing shape which gives the fish a most undesirable unappetising and unnatural appearance.

The base material may desirably be composed of a relatively stiff cardboard material having a stiffness such as that of Bristol board, but stiffer or more pliant material can be used depending upon the relative pliability of the meat. The base material may be sufficiently pliable to yield somewhat at the edges in order to meet the distorted flesh of the packaged material, but otherwise the sheet base material should be a self-sustaining material which provides a plane stiffened surface upon which the packaged material is to be assembled. Thin ordinary wood veneer or plyboard may be cut out in the described manner and many other planar or flat materials may be used for this purpose.

From the foregoing disclosure it will be recognized that the invention is susceptible of modification without departing from the spirit and scope thereof, and it is to be understood that the invention is not restricted to the specific illustrations thereof which are herein set forth.

I claim:

1. The process of packaging a body of flaccid meat material having easily deformable parts which comprises shaping a thin flat relatively difficultly deformable sheet-form base element in a form similar to a longitudinal cross-section of the material to be packaged; said base element being provided with shaped parts for supporting and retaining said easily deformable parts of said material from edgewise deformation on two sides and from sidewise deformation on only one side; assembling the body of meat material on said base element with its said easily deformable parts laid out on only one side of said shaped parts of the base element; enclosing the material and base element thus assembled in an envelope of a thin pliable imperforate sheeted wrapping material of the kind which shrinks when heated; reducing the pressure of air in said enclosure; said reduction of pressure being sufficient to collapse the wrapping and cavities within the meat, compress the meat into conformity with a contacting flat surface of the base member, remove air pockets between said wrapping and said material, and to effect closure of external openings of any erstwhile internal cavities in said material when said wrapping is shrunk; closing the wrapping to retain said reduced pressure; and then applying heat to the material at a temperature which is sufficient to shrink the wrapping until it is tightly and smoothly drawn around and in contact with all exposed surfaces of said meat material and the exposed surface and edges of said base element.

2. The process in accordance with claim 1 in which the heat is applied by immersing the wrapped assembly in hot water.

3. The process in accordance with claim 1 in which the base element is a stiff element which is not substantially deformed by the reduction of air pressure and by the shrinkage of the wrapping.

4. The process in accordance with claim 1 in which the base material is relatively difficult to deform by said exhaustion of air and shrinkage of the wrapper.

5. The process in accordance with claim 1 in which the base material is relatively slightly deformable by said exhaustion of air and by said shrinkage of the wrapper and is deviated from a plane surface at its lateral edges.

6. The process in accordance with claim 1 in which two eviscerated fish are placed back to back on one side of the base material with their tail fins overlapping; said base material being shaped generally in the form of the longitudinal cross-section of a fish, and having a length about that of the fish to be wrapped and a width not greater than the longitudinal cross-section of the two fish when assembled back to back.

7. The process in accordance with claim 1 in which an eviscerated fish is placed on one side of the base material; said base material is shaped generally in the form of the longitudinal cross-section of said eviscerated fish, and having a length about that of the fish and a width not greater than the longitudinal cross-section of the fish to be wrapped; the tail of said fish being spread out flat on the formed tail portion of said base element.

8. The process in accordance with claim 1 in which the base element is smaller than the longitudinal cross-section of the material to be wrapped so that the material to be wrapped will be distorted to meet the edges of the base element when the wrapping is shrunk.

9. The process in accordance with claim 1 in which the wrapped material is two eviscerated fish assembled on one side of the base material back to back; and said exhaustion and shrinkage of the enclosure formed by wrapping are carried on until the sides of the fish are collapsed and distorted so as to diminish the internal cavities of the fish and the external openings thereto are closed, until the wrapping material conforms to the exposed undulations of the assembled fish and the exposed surfaces and edges of the base material, and until air spaces are eliminated between the wrapping material and the fish.

10. The process in accordance with claim 1 in which the material to be wrapped is an eviscerated fish assembled on one side of the base material, the shape of which is generally like the cross-section of the fish and is about the length of the fish but narrower than its maximum longitudinal cross-section; and said exhaustion and shrinkage of the enclosure formed by wrapping are carried on until the cavity within the fish is reduced and the sides of the fish are collapsed thereby forming an external closure to the erstwhile cavity, and until the wrapping material conforms to the exposed undulations of the fish and the exposed surfaces and edges of the base material, and until air spaces are eliminated between the wrapping material and fish.

11. The process in accordance with claim 1 in which the wrapped material is finally frozen.

12. The process of packaging an eviscerated fish which comprises placing the fish on a thin relatively difficultly deformabte flat sheet-form base element with one side of the fish in contact with the base element and with the tail of the fish spread out upon the base element; said base element being at least as broad in its tail portion as the tail of said fish and about as long as said fish; enclosing said fish and base element thus assembled within a thin pliable imperforate sheeted wrapping material which shrinks when heated; reducing the pressure of air in said enclosure until the wrapping material is collapsed around the exposed surface of the fish and base element and until the air pockets between the said wrapping and the exposed surface of said fish are removed, and until the pressure of air in the eviscerated cavity of said fish is reduced and the margins of said cavity are closed; closing said wrapping to retain said reduced pressure; and applying heat to the wrapping material until the wrapping is tightly and smoothly shrunk around said fish and said base element.

13. The process in accordance with claim 12 in which the wrapped material is finally frozen.

14. An article of wrapped meat material comprising a body of relatively easily deformable and collapsible meat material, a relatively stiff flat base element shaped to conform to the longitudinal cross-section of the meat material to be wrapped and upon which said meat material is compressed, an evacuated imperforate wrapping of the kind which shrinks when heated enclosing said meat material and base element, said wrapping conforming to all the exposed surfaces and edges of said meat material and to the exposed parts of said base element, and being stretched therearound so as to exclude air pockets between the meat material and wrapping and so as to collapse the walls of any internal cavity within the meat material and close any external opening thereinto.

15. An article in accordance with claim 14 which is an eviscerated fish mounted on a relatively stiff flat thin member shaped similar to the longitudinal cross-section of a fish and having a tail portion upon which the tail fin of the fish is flattened out and protected from edgewise deformation by said base element.

16. An article in accordance with claim 14 which comprises two eviscerated fish assembled on a relatively stiff flat thin member shaped similar to the longitudinal cross-section of a fish and having a tail portion upon which the tail fins of the fish are assembled overlapping one another and flattened out on said base member and protected from edgewise deformation by said base element.

17. An article in accordance with claim 14 in which the meat material is compressed and frozen.

References Cited in the file of this patent

UNITED STATES PATENTS

| | | |
|---|---|---|
| 1,660,045 | Peterson | Feb. 21, 1928 |
| 1,710,386 | Taylor | Apr. 23, 1929 |
| 1,933,516 | Rosen | Oct. 31, 1933 |
| 2,071,300 | Gammeter | Feb. 16, 1937 |
| 2,376,583 | De Poix | May 22, 1945 |
| 2,536,639 | Guyer | Jan. 2, 1951 |
| 2,596,514 | Uehlein | May 13, 1952 |

OTHER REFERENCES

"Modern Packaging," September 1950, pages 93, 94, and 95.